(12) United States Patent
Lundqvist et al.

(10) Patent No.: US 9,092,724 B2
(45) Date of Patent: Jul. 28, 2015

(54) METHOD FOR DUEL HANDLING IN A COMBAT AIRCRAFT

(75) Inventors: Anders Lundqvist, Vaxholm (SE); Vibeke Kensing, Vikingstad (SE)

(73) Assignee: SAAB AB, Linkoeping (SE)

(*) Notice: Subject to any disclaimer, the term of this patent is extended or adjusted under 35 U.S.C. 154(b) by 0 days.

(21) Appl. No.: 14/352,131

(22) PCT Filed: Feb. 16, 2012

(86) PCT No.: PCT/SE2012/050167
§ 371 (c)(1), (2), (4) Date: Apr. 16, 2014

(87) PCT Pub. No.: WO2013/122520
PCT Pub. Date: Aug. 22, 2013

(65) Prior Publication Data
US 2014/0288907 A1  Sep. 25, 2014

(51) Int. Cl.
*G06G 7/48* (2006.01)
*G06N 7/00* (2006.01)
*F41G 9/00* (2006.01)

(52) U.S. Cl.
CPC .. *G06N 7/00* (2013.01); *F41G 9/00* (2013.01); *F41G 9/002* (2013.01)

(58) Field of Classification Search
CPC ... G01V 5/0008; G01V 5/0083; G01C 23/00; G01S 7/021; F41H 11/02; G06N 7/00
USPC .......................................... 701/3, 5; 703/2, 8
See application file for complete search history.

(56) References Cited

U.S. PATENT DOCUMENTS

| 4,797,839 A | 1/1989 | Powell |
| 5,047,779 A * | 9/1991 | Hager ........................... 342/120 |

(Continued)

FOREIGN PATENT DOCUMENTS

| DE | 19731111 A1 | 1/1999 |
| DE | 102010019936 A1 | 11/2011 |

OTHER PUBLICATIONS

International Searching Authority (ISA), International Search Report and Written Opinion for International Application No. PCT/SE2012/050167, Nov. 8, 2012, 10 pages, Swedish Patent and Registration Office, Sweden.

(Continued)

*Primary Examiner* — Helal A Algahaim
*Assistant Examiner* — Shardul Patel
(74) *Attorney, Agent, or Firm* — Alston & Bird LLP

(57) ABSTRACT

The invention relates to a method for decision support of a first combat aircraft in a duel situation with a second combat aircraft. The method comprises the steps of: a) determining (3) a first plurality of combat value parameters of the first combat aircraft (1) and determining (3) a second plurality of combat value parameters of the second combat aircraft (2), wherein the second combat aircraft (2) is different to the first combat aircraft (1), b) analyzing (4) the first and the second plurality of combat value parameters determined in the previous step (step a)) by fitting the first and the second plurality of combat value parameters to a predefined model, and c) combining (5) the first plurality of combat value parameters analyzed in the previous step (step b)) to calculate a first value and combining (5) the second plurality of combat value parameters analyzed in the previous step (step b)) to calculate a second value, wherein the first value and the second value are compared to each other to determine the optimum success probability data of the first combat aircraft (1) and of the second combat aircraft (2) adapted for decision support in the duel situation. In this way, a reliable and fast tool for the pilot is provided while the tool is easy to handle and assists the pilot in order to make a quick and efficient decision in duel situations.

10 Claims, 1 Drawing Sheet

(56) References Cited

U.S. PATENT DOCUMENTS

| | | | |
|---|---|---|---|
| 5,418,364 A * | 5/1995 | Hale et al. | 250/334 |
| 2005/0038628 A1* | 2/2005 | Beuttel et al. | 702/179 |
| 2008/0191127 A1* | 8/2008 | Fine et al. | 250/235 |
| 2009/0271157 A1* | 10/2009 | Herman et al. | 703/2 |
| 2009/0322584 A1* | 12/2009 | Herman | 342/13 |
| 2010/0010793 A1* | 1/2010 | Herman | 703/8 |
| 2011/0057071 A1* | 3/2011 | Sahasrabudhe et al. | 244/17.13 |

OTHER PUBLICATIONS

International Preliminary Examining Authority, International Preliminary Report on Patentability for International Application No. PCT/SE2012/050167, including SAAB AB's response to the ISA's Nov. 8, 2012 Written Opinion, Jan. 15, 2014, 11 pages, Swedish Patent and Registration Office, Sweden.

* cited by examiner

METHOD FOR DUEL HANDLING IN A COMBAT AIRCRAFT

CROSS REFERENCE TO RELATED APPLICATIONS

This application is a national stage application, filed under 35 U.S.C. §371, of International Application No. PCT/SE2012/050167, filed Feb. 16, 2012, the contents of which are hereby incorporated by reference in its entirety.

BACKGROUND

1. Related Field

The invention relates to a method for decision support of a first combat aircraft in a duel situation with a second combat aircraft.

2. Description of Related Art

Document U.S. Pat. No. 4,797,839 describes a resource allocation system for indicating the optimum allocation of a resource between a series of demands iteratively processing the probability data for each demand to determine for each a range of amounts of resource available the optimum distribution of the resource between the demands and the resultant probability of successfully overcoming all the demands.

Typically support functions are available for the pilot environment in combat aircraft, such as human machine interface, HMI for short, and decision support. The solutions are usually based on and are adapted for high tempo in flight and combat situations where HMI and decision support together describe the current position and then display the tools and solutions to the pilot.

Solutions are commonly based on the aircraft itself and its available resources and tools. Sensors, such as radar, are operated by the pilot as a tool for close-range scanning or for scanning objects for identification and continued pursuit. Decision support as a support function supports the multiple use of sensors by merging objects detected by several different sensors and then coordinates and correlates these objects in a situation picture. This is typically done via networks in further steps to create a common situation picture between several aircrafts within an aircraft group.

When the complexity increases because more tools and sensors are supplied, the possibilities available to the pilot in order to control the tools and/or sensors in time are limited. This makes it difficult for the pilot to manage duel situations. Hence, in time-critical situations, such as in air combat, the pilot risks becoming the underdog. Further, each tool and/or sensor has its own characteristics and peculiarities. Therefore, each sensor and/or tool requires its own interface and control functions which the pilot needs to be able to understand and use correctly which is not an easy task.

BRIEF SUMMARY

It is the object of the invention to provide a tool which makes it possible to assist a pilot in decision support such that the pilot can easily manage duel situations while the tool is reliable and fast and thus supports a quick and efficient decision in duel situations.

This object is achieved by the subject matter of independent claim 1. Preferred embodiments are defined in the sub claims.

According to an aspect of the invention, this object is achieved by a method for decision support of a first combat aircraft in a duel situation with a second combat aircraft comprising the steps of: a) determining a first plurality of combat value parameters of the first combat aircraft and determining a second plurality of combat value parameters of the second combat aircraft, wherein the second combat aircraft is different to the first combat aircraft, b) analyzing the first and the second plurality of combat value parameters determined in the previous step (step a)) by fitting the first and the second plurality of combat value parameters to a predefined model, and c) combining the first plurality of combat value parameters analyzed in the previous step (step b)) to calculate a first value and combining the second plurality of combat value parameters analyzed in the previous step (step b)) to calculate a second value, wherein the first value and the second value are compared to each other to determine the optimum success probability data of the first combat aircraft and of the second combat aircraft adapted for decision support in the duel situation.

It is an idea of the invention to provide an HMI implementation for describing and evaluating combatants in a duel situation. The pilot's own options are thus analyzed and evaluated, then coordinated to form a characteristic value. This value can be displayed as a sphere around the pilot's own aircraft. For the enemy a corresponding analysis is conducted based on the alternatives that may prevent or limit his possibilities. The coordinated characteristic value for the enemy can also be displayed as a sphere around the enemy object, such as the enemy aircraft. In this way, the pilot is provided with a clearer idea of the situation by visually conveying the combat position in a duel situation.

According to a preferred embodiment of the invention, the predefined model comprises at least one of a probabilistic model, a deterministic model and a model comprising a predefined number of libraries. The predefined model preferably corresponds to a linear model, such as to a Gaussian model.

By using such simple models this tool is reliable and fast to use. Further, the pilot can thus easily manage a duel situation.

Furthermore, according to a preferred embodiment of the invention, combining is performed by applying a predefined algorithm. The term "combining" means that the calculation procedure is carried out with the plurality of combat value parameters in order to arrive at a predefined value which is characteristic for the respective combat aircraft.

According to a preferred embodiment of the invention, the method further comprises the step of storing the determined data in step a), the analyzed data in step b) and/or the calculated data in step c). Preferably, the method further comprises the step of displaying the determined data in step a), the analyzed data in step b) and/or the calculated data in step c). In this way, the pilot can make a quick and efficient decision. This is supported by visualising his tools. Displaying the calculated data in step c) preferably comprises displaying the first value on a first sphere or first circle around the first combat aircraft and/or displaying the second value on a second sphere or second circle around the second combat aircraft. Further, the step of displaying comprises displaying a tool and/or a solution to the pilot of the first combat aircraft dependent on the ratio of the radii of the first sphere and the second sphere or dependent on the ratio of the radii of the first circle and the second circle. In this way the pilot becomes aware of possible dangers and advantages in the duel situation and can simply choose his preferred tactics in the duel situation.

According to a preferred embodiment of the invention, the step of determining is performed by a sensor, such as radar, a database and/or a link. The first and the second combat value parameters preferably comprise at least one of a position parameter, a radius of a first sphere and/or a second sphere, a radius of a first circle and/or a second circle, a weapon range parameter, a sensor locking parameter and/or an alternative manoeuvre parameter. The first combat aircraft preferably corresponds to a pilot's own aircraft and the second combat aircraft corresponds to an enemy aircraft.

BRIEF DESCRIPTION OF THE FIGURES

These and other aspects of the invention will be apparent from and elucidated with reference to the embodiments described hereinafter.

In the drawings.

DETAILED DESCRIPTION OF VARIOUS EMBODIMENTS

Figure 1:
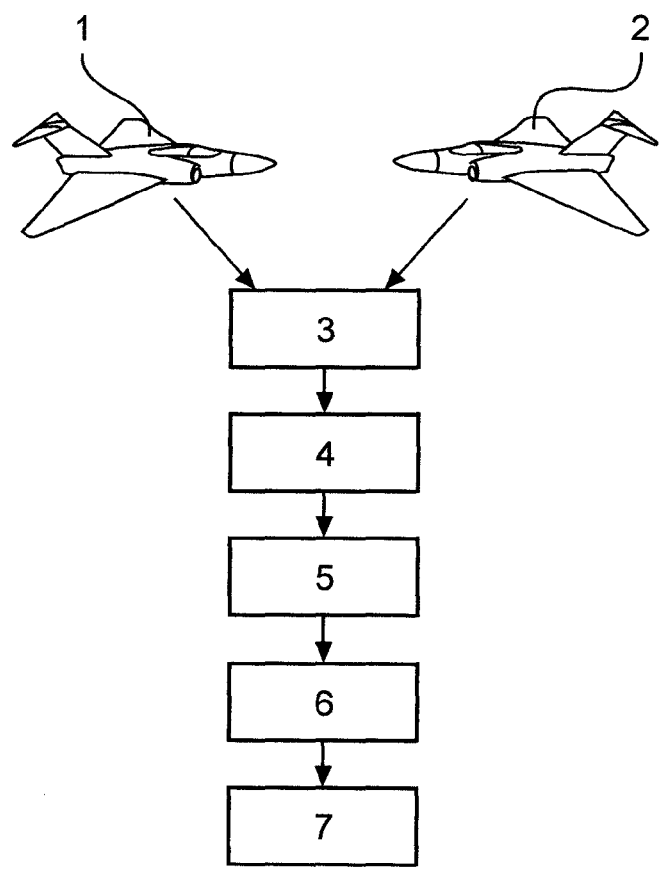
FIG. 1 illustrates a method according to a preferred embodiment of the invention.

FIG. 1 shows the steps of a method for decision support according a preferred embodiment of the invention. A first combat aircraft 1 is in a duel situation with a second combat aircraft 2. In a first step, a first plurality of combat value parameters of the first combat aircraft 1 is determined 3 and a second plurality of combat value parameters of the second combat aircraft 2 is determined 3. In a second step, the first and the second plurality of combat value parameters determined in the first step are analyzed 4 by fitting the first and the second plurality of combat value parameters to a predefined model, and, in a third step, the first plurality of combat value parameters analyzed in the second step are combined 5 to calculate a first value and the second plurality of combat value parameters analyzed in the second step are combined 5 to calculate a second value. These values, i.e. the first value and the second value, are compared to each other to determine the optimum success probability data of the first combat aircraft 1 and of the second combat aircraft 2. In further steps the relevant data are stored 6 and displayed 7.

Figure 2:
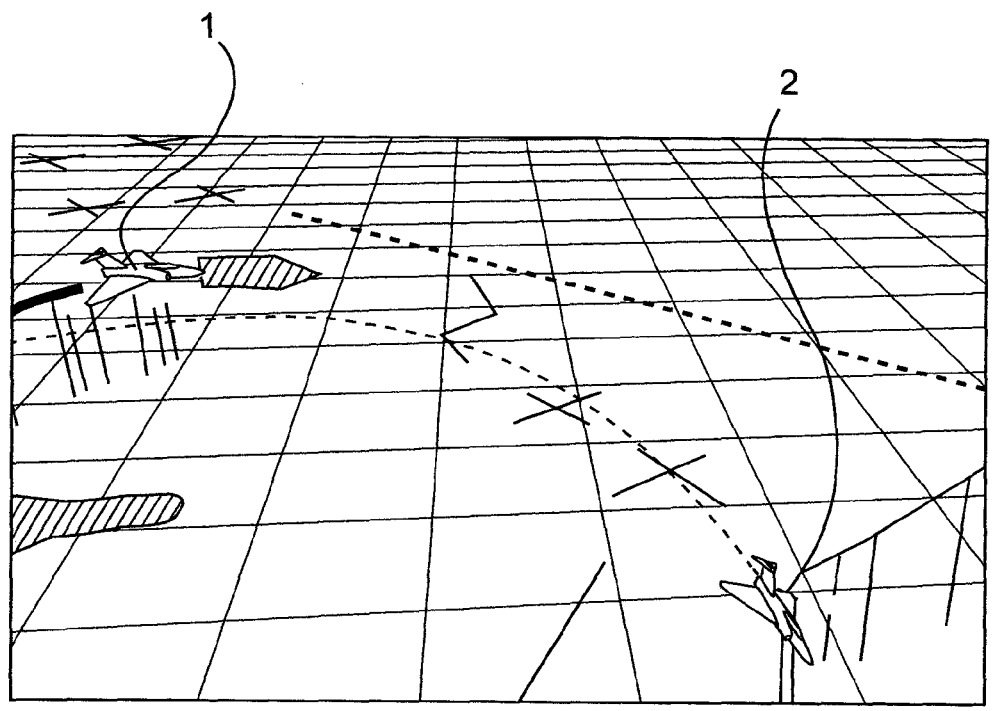
FIG. 2 illustrates a combat situation according to another preferred embodiment of the invention.

FIG. 2 shows a combat situation according to another preferred embodiment of the invention. It illustrates that large spheres correspond to good combat possibilities. If there is a small sphere around an opponent 2, then the opponent 2 has a variety of options. The pilot in his own aircraft 1 can choose between a defensive strategy and an offensive strategy. All the input combat parameters are coordinated to form a value which is characteristic and visually constitutes the radius in a sphere or in a circle, dependent on a three-dimensional or two-dimensional illustration. The size of the sphere indicates a likelihood of succeeding in the operation, because a large sphere in the pilot's own aircraft 1 indicates the evaluated limits to a successful escape from the enemy 2. The size of the enemy's sphere indicates the possibility of succeeding in the operation of the pilot in his own aircraft 1. A large sphere indicates an evaluated clear combat superiority, whereas a smaller sphere indicates a much more difficult situation.

The pilot can choose between the defensive strategy and the offensive strategy. Both choices comprise similar steps but the goal is different. Using the defensive strategy the pilot focus on expanding his own sphere to survive the duel situation, whereas when using the offensive strategy the pilot has the goal to destruct or prohibit the enemy in the duel situation. Firstly, the enemy is detected. Secondly, he is identified and engaged. Finally, the enemy is destructed. Since both aircrafts 1, 2 can choose both tactics there are four possible situations which make the choice of the tactics adaptive. This usually depends on the situation of the pilot's own aircraft.

When the own aircraft 1 and the enemy aircraft 2 both show large spheres, there is a good combat possibility with good protection possible for the own aircraft 1. In this case a free choice of tactics is possible. In case that there is a large own sphere and a small enemy sphere, there is only a limited destruct possibility but with good protection. In this case defensive strategy is the best strategy to choose. In the third case, where there is a small own sphere and a large enemy sphere, a good combat possibility is given but with a high risk. In this case the offensive strategy is best. In the fourth case, i.e. a small own sphere and a small enemy sphere, the pilot's own aircraft 1 is an underdog relative to the enemy 2. In this latter case regardless of strategy, it is better not to seek further combat.

The invention provides a rapid situation assessment in duel situations. An immediate overview can be obtained by using spheres with a three-dimensional visualization. The invention provides the possibility of being able to visualize decision support quickly relating to a superior or to an inferior situation in a duel situation.

While the invention has been illustrated and described in detail in the drawings and foregoing description, such illustration and description are to be considered illustrative or exemplary and not restrictive and it is not intended to limit the invention to the disclosed embodiments. The mere fact that certain measures are recited in mutually different dependent claims does not indicate that a combination of these measures cannot be used advantageously.

The invention claimed is:

1. A method for decision support of a first combat aircraft (1) in a duel situation with a second combat aircraft (2), the method comprising the steps of:
   a) determining (3) a first plurality of combat value parameters of the first combat aircraft (1) and determining (3) a second plurality of combat value parameters of the second combat aircraft (2), wherein the second combat aircraft (2) is different to the first combat aircraft (1), wherein the first combat aircraft is an own aircraft and the second combat aircraft is an enemy aircraft,
   b) analyzing (4) the first and the second plurality of combat value parameters determined in the previous step by fitting the first and the second plurality of combat value parameters to a predefined model,
   c) combining (5) the first plurality of combat value parameters analyzed in the previous step to calculate a first consolidated value and combining (5) the second plurality of combat value parameters analyzed in the previous step to calculate a second consolidated value, wherein the first consolidated value and the second consolidated value are compared to each other to determine optimum success probability data of the first combat aircraft (1) and of the second combat aircraft (2) configured for decision support in the duel situation;
   d) displaying (7) at least one of the calculated first value on a first sphere or circle around the first combat aircraft or the calculated second value on a second sphere or circle around the second combat aircraft, the first sphere or circle and the second sphere or circle being generated based at least in part upon the first and second consolidated values; and
   e) displaying (7) at least one of a tool or a solution to the pilot of the first combat aircraft (1) dependent upon at least one of the ratio of the radii of the first sphere to the second sphere or the ratio of the radii of the first circle to the second circle, wherein the tool or the solution convey at least the determined optimum success probability data.

2. The method according to claim 1, wherein the predefined model comprises at least one of a probabilistic model, a deterministic model, or a model comprising a predefined number of libraries.

3. The method according to claim 2, wherein the predefined model corresponds to a linear model.

4. The method according to claim 3, wherein the linear model is a Gaussian model.

5. The method according to claim 1, wherein combining (5) step is performed by applying a predefined algorithm.

6. The method according to claim 1, further comprising the step of storing (6) at least one of the determined data in step a), the analyzed data in step b), or the calculated data in step c).

7. The method according to claim 1, further comprising the step of displaying (7) at least one of the determined data in step a) or the analyzed data in step b.

8. The method according to claim 1, wherein the step of determining (3) is performed by a sensor.

9. The method according to claim 8, wherein the sensor is at least one of a radar, a database, or a link.

10. The method according to claim 1, wherein the first and the second combat value parameters comprise at least one of a position parameter, a radius of at least one of a first sphere or a second sphere, a radius of at least one of a first circle or a second circle, a weapon range parameter, a sensor locking parameter, or an alternative maneuver parameter.

* * * * *